United States Patent [19]
Klueter

[11] Patent Number: 5,376,780
[45] Date of Patent: Dec. 27, 1994

[54] METHOD OF AND ARRANGEMENT FOR READING A BAR CODE ON PHOTOGRAPHIC MATERIAL

[75] Inventor: Ulrich Klueter, Munich, Germany

[73] Assignee: Agfa-Gevaert Aktiengesellschaft, Leverkusen, Germany

[21] Appl. No.: 22,716

[22] Filed: Feb. 24, 1993

[30] Foreign Application Priority Data

Mar. 13, 1992 [DE] Germany .............. 4208082

[51] Int. Cl.$^5$ ................................ G06K 7/10
[52] U.S. Cl. .................... 235/462; 235/454; 235/466; 250/568
[58] Field of Search ............ 250/568, 570; 235/454, 235/462, 466

[56] References Cited

U.S. PATENT DOCUMENTS 4,276,470  6/1981  Rady et al. .............. 235/493
4,629,876 12/1986  Kubota et al. ........... 235/462
5,122,645  6/1992  Saeki et al. ............. 235/462
5,164,574 11/1992  Ujiie et al. ............. 235/462
5,212,367  5/1993  Takenaka ................ 235/462

Primary Examiner—John Shepperd
Attorney, Agent, or Firm—Darby & Darby

[57] ABSTRACT

A bar code is scanned to generate a signal which is representative of the bar code and contains a series of maxima and minima. The signal is sampled to detect the maxima and minima corresponding to the encoded information of the bar code. The detected maxima are compared with an upper threshold value while the detected minima are compared with a lower threshold value. For each detected maximum and minimum, a "0" or "1" is entered in a memory depending upon whether or not the detected maximum or minimum exceeds the corresponding threshold value. This produces an array of bits which is then decoded.

26 Claims, 4 Drawing Sheets

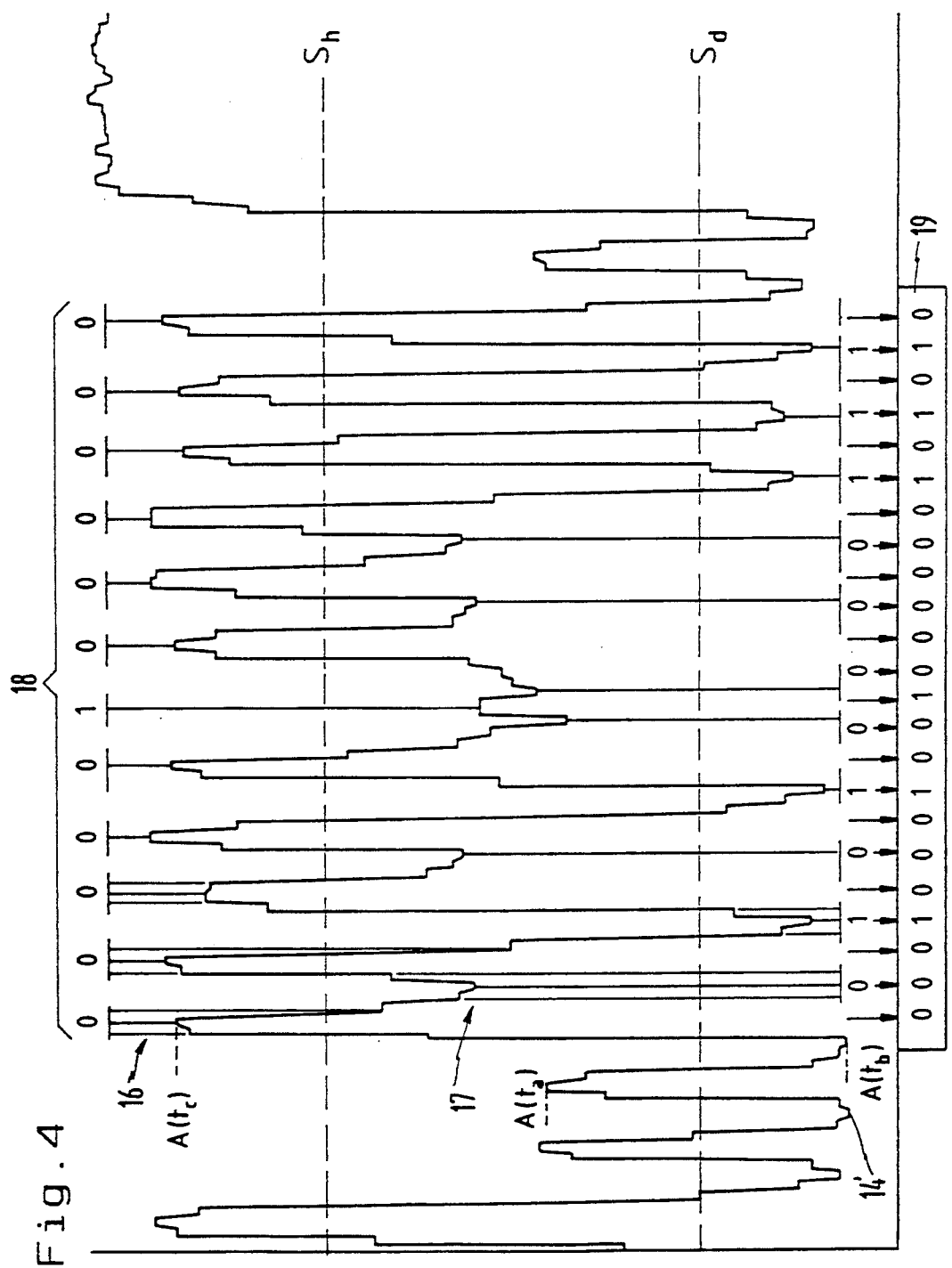

METHOD OF AND ARRANGEMENT FOR READING A BAR CODE ON PHOTOGRAPHIC MATERIAL

BACKGROUND OF THE INVENTION

The invention relates generally to the reading codes.

More particularly, the invention relates to the reading of bar codes on photographic material.

Bar codes in the form of so-called DX codes are reproduced on the margins of photographic films and provide information about the film manufacturer and the type of film. Some manufacturers now employ an extended DX code which, in addition, contains the respective image or frame numbers in encoded form. To allow reading and decoding of the encoded information, a clock track is arranged parallel to the data track containing such information.

The European patent application 331 049 discloses an apparatus having a film guide, and a reading device on either side of the film guide. Each reading device consists of two photosensors. With these reading devices, the encoded information and the clock track can be detected separately.

However, photographic films having the same format do not always have the same width so that the positions of the clock track and the data track relative to the photosensors can change. This can result in a certain degree of superposition, and thus in reading and interpretation errors.

In an attempt to eliminate this problem, the photosensors on one side of the guide have been mounted on a movable carrier whose position is automatically adjusted to the particular film width. This solution is, however, very complicated mechanically and consequently susceptible to errors. Moreover, it requires very much room.

SUMMARY OF THE INVENTION

It is an object of the invention to provide a method which enables errors in the reading of a code to be reduced.

Another object of the invention is to provide a method which allows a code to be read with less mechanical complexity than heretofore.

An additional object of the invention is to provide a method which does not require as much room as previously for the reading of a code.

A further object of the invention is to provide an arrangement which makes it possible to reduce errors in the reading of a code.

It is also an object of the invention to provide an arrangement which can read a code in a mechanically simpler manner than heretofore.

Still another object of the invention is to provide an arrangement which is capable of reading a code in a smaller space than required until now.

The preceding objects, as well as others which will become apparent as the description proceeds, are achieved by the invention.

One aspect of the invention resides in a method of reading a code, particularly in a photographic printer. The method comprises the steps of scanning the code, generating a data signal representative of the code based on the scanning step, and establishing the type of the code using the data signal. The data signal contains maxima and minima, and the method further comprises the steps of sampling a selected part of the data signal to detect selected maxima and selected minima, comparing each of the selected maxima with a first value and each of the selected minima with a second value, and deriving a decipherable set of data bits using the results of the comparing step.

The code may be provided on a margin of photographic material such as film. The code, which may be a bar code, has two end portions and a segment between the end portions containing encoded information. The selected part of the data signal preferably corresponds to this segment. For the sake of clarity, the respective end portions of the code will be referred to as a leading end portion and a trailing end portion although this is not to be construed as meaning that the leading end portion must always lead.

The establishing step may include determining the length of the code. The scanning step will normally be performed by moving the code and a sensor for the code relative to one another, and determination of the length of the code may then involve detecting the end portions of the code and measuring the relative speed of the sensor and the code.

If the code is a bar code, the code will include a series of bars as well as gaps between neighboring bars. The establishing step may here comprise determining the number of bars and gaps. The sampling step may be carried out stepwise with the number of steps being related to, e.g., equaling, the number of bars and gaps in the information-containing segment of the code.

Only one output or data signal is required for the method of the invention. It is irrelevant whether a single sensor is used or whether two or more sensors are used and their signals added. The parts of the data signal corresponding to the leading and trailing end portions of the code can be determined without difficulty. If now, in addition, there is information on the speed of movement of the code past the sensor or sensors, or on the speed of movement of the sensor or sensors past the code, the length of the code can be calculated. Presently, three different types of codes are applied to film. One of these is the conventional DX code containing information only on the type of film and the manufacturer while another is the extended DX code which additionally gives the respective image or frame number. Finally, certain manufacturers use another code which is applied to the side of the film opposite that with the DX code and contains exclusively the frame or image number. Since the lengths of all three currently conventional codes are distinctly different, a scanned code can be identified by its length without difficulty. The segment of the code which carries the information and lies between the leading and trailing end portions is then sampled for maxima and minima stepwise with the number of steps being related to the number of bars and gaps in the segment of the identified code type. By comparing each of the detected maxima with an upper threshold value and each of the detected minima with a lower threshold value, an array or set of bits can be generated. This array of bits can be decoded in the usual fashion.

The code can include two laterally adjacent sections or tracks, namely, a data section constituted in part by the segment containing the encoded information, and a clocking or synchronizing section. The method according to the invention can be performed successfully by scanning only the data section of the code and disregarding the clocking section. However, greater reading reliability can be achieved when the scanning step is carried out so that both sections are scanned simultaneously and the common output or data signal is used.

It is possible to obtain adequate precision by operating with fixed threshold values. Nevertheless, the precision can be increased when fixed threshold values are not employed and, instead, the threshold values are calculated on the basis of the data signal derived from the sensor or sensors.

The scanning step may yield a raw signal and the step of generating the data signal may then comprise processing the raw signal to obtain the data signal. Such processing advantageously includes amplification, conversion to logarithmic form and digitization. The data signal generated during processing may be stored in a first memory.

The method may additionally comprise the step of subjecting the data signal to low-pass filtering. This produces a smoothed or filtered signal in which high-frequency components of the data signal have been eliminated. The low-pass filtering may be achieved by means of program control or by means of appropriate hardware. The filtered signal may be stored in a second memory.

The leading end portion of the code corresponds to a first part of the data signal while the trailing end portion corresponds to a second part of the data signal. In order to identify the first and second parts of the data signal, the filtered signal is examined so as to detect the lowest and second lowest of its minima. For the most part, the lowest and second lowest minima of the filtered signal will each correspond to the middle of a respective end portion of the code, and hence to either the first or second part of the data signal.

The sensor or sensors may be stationary while the code is advanced stepwise, for example, by means of a stepping motor. Here, the length of the code is advantageously determined by counting the steps taken by the code inasmuch as the number of steps is a measure of the speed of the code relative to the sensor or sensors. A pulse may be issued in response to each step taken by the code and the operation of counting the steps may then involve recording the pulses.

The method may further comprise the step of determining the orientation of the code by performing analyses on opposite sides of either the first or second part of the data signal, i.e., on opposite sides of a part of the data signal corresponding to the leading or trailing end portion of the code. Determination of the orientation of the code may include carrying out a Fourier transformation on each side of the first or second part of the data signal.

Another aspect of the invention resides in an arrangement for reading a code. One embodiment of the arrangement comprises means for scanning the code and generating a data signal which contains maxima and minima and is representative of the code; and means for establishing the type of the code using the data signal, sampling a selected part of the data signal to detect selected maxima and selected minima, comparing each of the selected maxima with a first value and each of the selected minima with a second value, and deriving a decipherable set of data bits using the results of the comparisons.

Another embodiment of the arrangement in accordance with the invention comprises means for positioning the code, and means for detecting the code. The detecting means advantageously includes a sensor, e.g., a photosensor, for scanning the data section and the clocking section of the code simultaneously.

On the one hand, a sensor which can scan both sections of the code simultaneously provides the advantage that greater reading accuracy can be achieved. On the other hand, such a sensor allows the mechanical design to be substantially less complicated than that for an arrangement where the clocking section and the data section are each scanned by their own sensor. Since even today there are no sensors small enough to be placed side-by-side in order to scan the data section and the clocking section of a code separately, it is necessary to place individual sensors for the two sections at different locations and to transmit the signals for the clocking section and the data section through optical fibers. A sensor sufficiently large to scan the data section and clocking section of a code simultaneously can be readily mounted at an appropriate location, e.g., of a film guide, so that further signal transmission via optical fibers can be eliminated. Such a sensor can have a width at least equal to the width of the code, that is, the combined width of the clocking section and the data section.

The positioning means may comprise means for directing the code along a marginal portion of a predetermined path having a pair of opposed marginal portions. The sensor for scanning the two sections of the code simultaneously may be disposed in the region of one of the marginal portions.

As mentioned previously, the code may be provided on a margin of a photographic material. In order to be able to read the code in any orientation of the photographic material, the detecting means may include an additional sensor in the region of the second marginal portion of the predetermined path. The sensors at the two marginal portions of the predetermined path are preferably identical.

At times, it is necessary to process a frame or image of a film individually. However, it is difficult to transport an individual frame or image at constant speed. To alleviate this problem, the arrangement of the invention may further comprise a carriage for the sensors. The frame or image can then be held still while the carriage moves.

The arrangement of the invention is especially well-suited for carrying out the method in accordance with the invention. The arrangement can be used with particular advantage in a photographic printer to read a code provided on a margin of a photographic material.

The novel features which are considered as characteristic of the invention are set forth in particular in the appended claims. The improved reading method, as well as the construction and mode of operation of the improved reading arrangement, together with additional features and advantages of the method and arrangement, will, however, be best understood upon perusal of the following detailed description of certain specific embodiments when read in conjunction with the accompanying drawings.

BRIEF DESCRIPTION OF THE DRAWINGS

FIG. 3b shows a data signal derived from the code of FIG. 3a;

FIG. 4 is a diagram illustrating the production of a decipherable array of bits.

DESCRIPTION OF THE PREFERRED EMBODIMENTS

Figure 1:
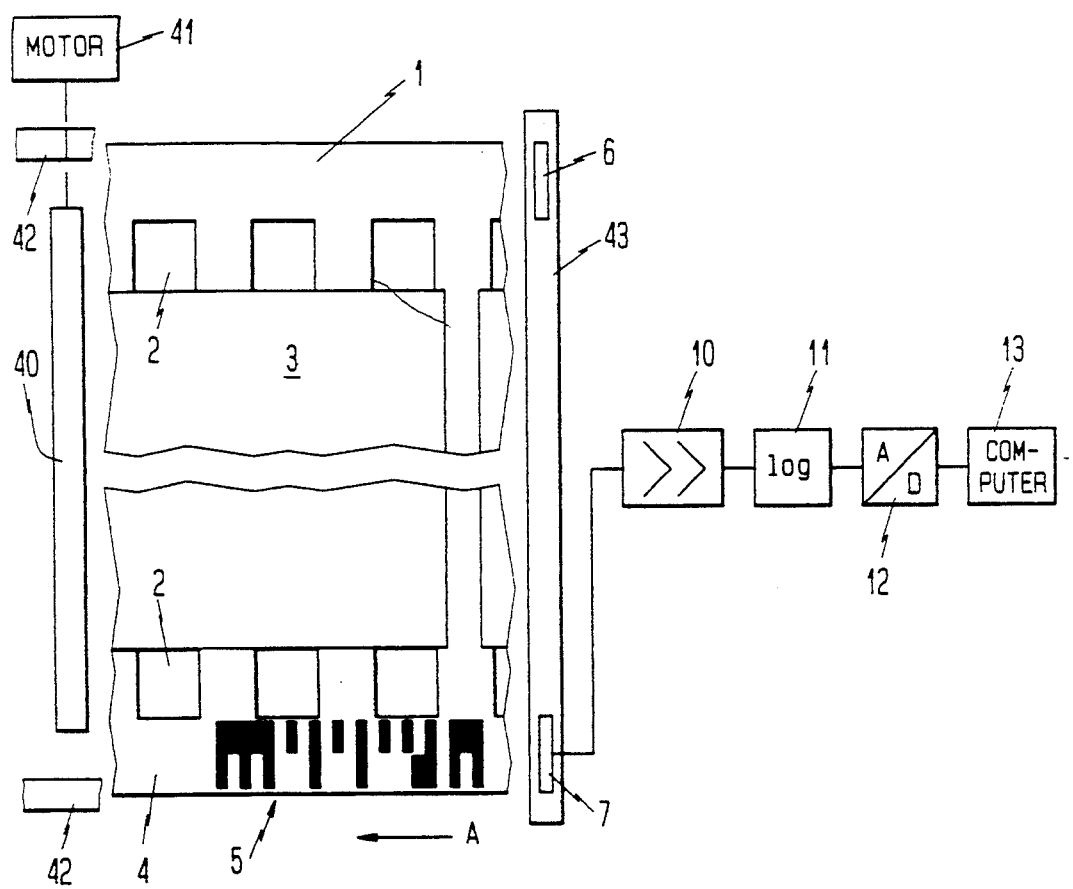
FIG. 1 schematically illustrates an arrangement according to the invention for reading a code.
Figure 2A:
FIGS. 2A and 2B shows two conventional DX codes.
Figure 2B:

Referring to FIG. 1, the reference numeral 1 identifies a filmstrip which is here assumed to be constituted by one or more conventional 135 mm small format films. The filmstrip 1 is formed with two rows of perforations 2 and carries a series of discrete frames or images 3 which are disposed between the rows. A bar code 5 which, in the illustrated embodiment, takes the form of a DX code is provided on one longitudinal margin 4 of the filmstrip 1. The bar code 5 contains information on the type of film and on the manufacturer. A so-called extended DX code is also in use currently and additionally contains the image number. Both of the DX codes presently employed are shown in FIGS. 2A and 2B.

The filmstrip 1 of FIG. 1 can be conveyed along a predetermined path in the direction of the arrow A by suitable transporting means which is here represented by a roller 40. The roller 40 is driven by a stepping motor 41 which can cause the filmstrip 1 to advance stepwise and generates a pulse for each step. Guiding means is provided for the filmstrip 1 and includes two marginal sections or guides 42. Each of the guides 42 is located adjacent a respective longitudinal marginal portion of the path of the filmstrip 1 and confines a respective longitudinal margin of the filmstrip 1. The guides 42 serve to position the filmstrip 1 in the predetermined path and, in conjunction with the roller 40, to guide or direct the filmstrip 1 along such path when the filmstrip 1 is advanced.

A sensor 6 is mounted adjacent to one of the guides 42 while an identical second sensor 7 is mounted adjacent to the other of the guides 42. Each of the sensors 6,7 is in register with a respective longitudinal margin of the filmstrip 1, and the purpose of the sensors 6,7 is to scan the bar code 5 provided on the longitudinal margin 4 of the filmstrip 1. By placing the sensors 6,7 at opposite sides of the path of travel of the filmstrip 1, it becomes possible to read the bar code 5 regardless of whether the filmstrip 1 is advanced with the first frame leading or with the last frame leading. The sensors 6 and 7, which are here assumed to be photosensors, generate output signals representative of the bar code 5 upon scanning the latter.

The sensors 6,7 are mounted on a carriage 43 which is movable in and counter to the direction A. This makes it possible to keep the filmstrip 1 stationary and to scan the bar code 5 by moving the sensors 6,7 along the filmstrip 1. The carriage 5 is particularly useful when a single frame or image, rather than an entire filmstrip 1, is to be processed.

Figure 3A:
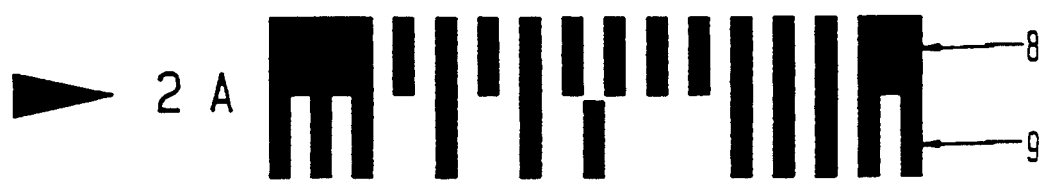
FIG. 3a illustrates an extended DX code containing frame numbers for a film.

FIG. 3a shows that the bar code 5 includes two laterally adjacent tracks or sections 8 and 9. The track 9 is a data track while the track 8 is a clocking or synchronizing track. The data track 9 includes two end portions, and a segment between the end portions containing encoded information. The end portion of the data track 9 which is in the lead in FIG. 1 will here be denoted a leading end portion while the end portion which trails in FIG. 1 will be denoted a trailing end portion. This labeling of the end portions is not to be construed as meaning that the leading end portion will always lead but is intended only to simplify the description.

The width of each of the sensors 6 and 7, i.e., the dimension of each of the sensors 6,7 as considered transverse to the path of travel, or the direction of advance A, of the filmstrip 1 is selected in such a manner that either of the sensors 6,7 can scan both tracks 8,9 simultaneously.

With reference once more to FIG. 1, the output signal of a sensor 6 or 7 is sent to an amplifier 10 for amplification and is then converted to logarithmic form in a logarithmic unit 11. The logarithmic signal is digitized in an analog-digital converter 12 and subsequently enters a computer 13.

The arrangement of FIG. 1 can be used, for example, in a printer for the filmstrip 1.

Figure 3B:
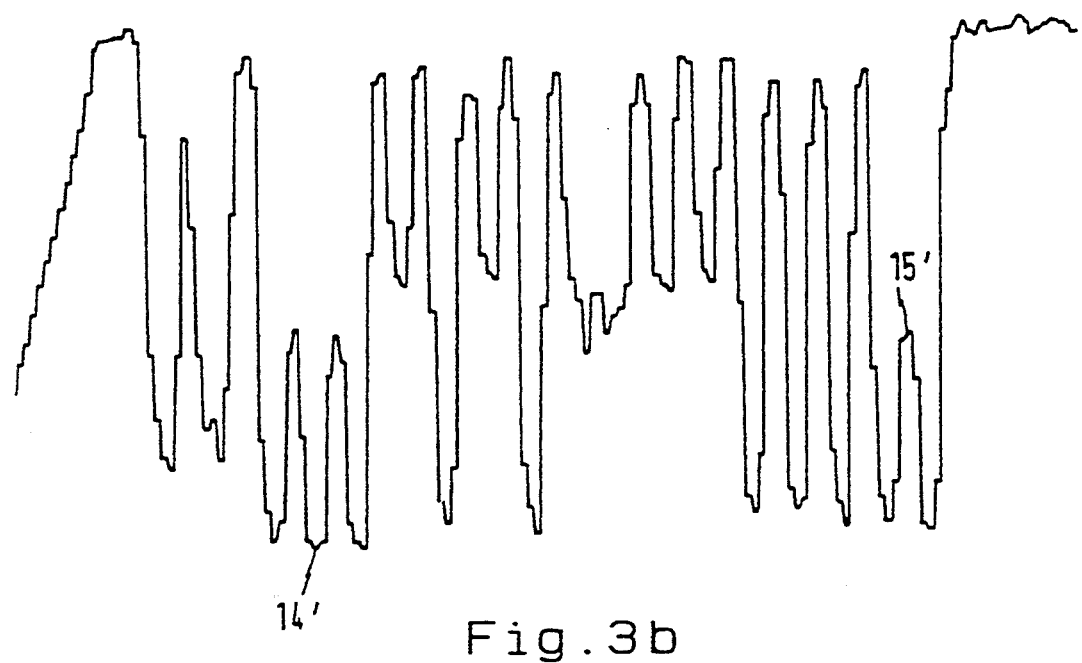

FIG. 3b illustrates the signal obtained by scanning the DX code 5 of FIG. 3a with one of the sensors 6,7. This signal, which will be referred to as a data signal, is the signal derived by processing the output signal of a sensor 6,7 in the amplifier 10, logarithmic unit 11 and analog-digital converter 12. The data signal contains a series of maxima as well as a series of minima.

The data signal is analyzed in a manner described below. However, in order to achieve the greatest reading accuracy, the entire length of the filmstrip 1 is scanned prior to analyzing the data signal. This yields an overall signal for the filmstrip 1.

Figure 5:
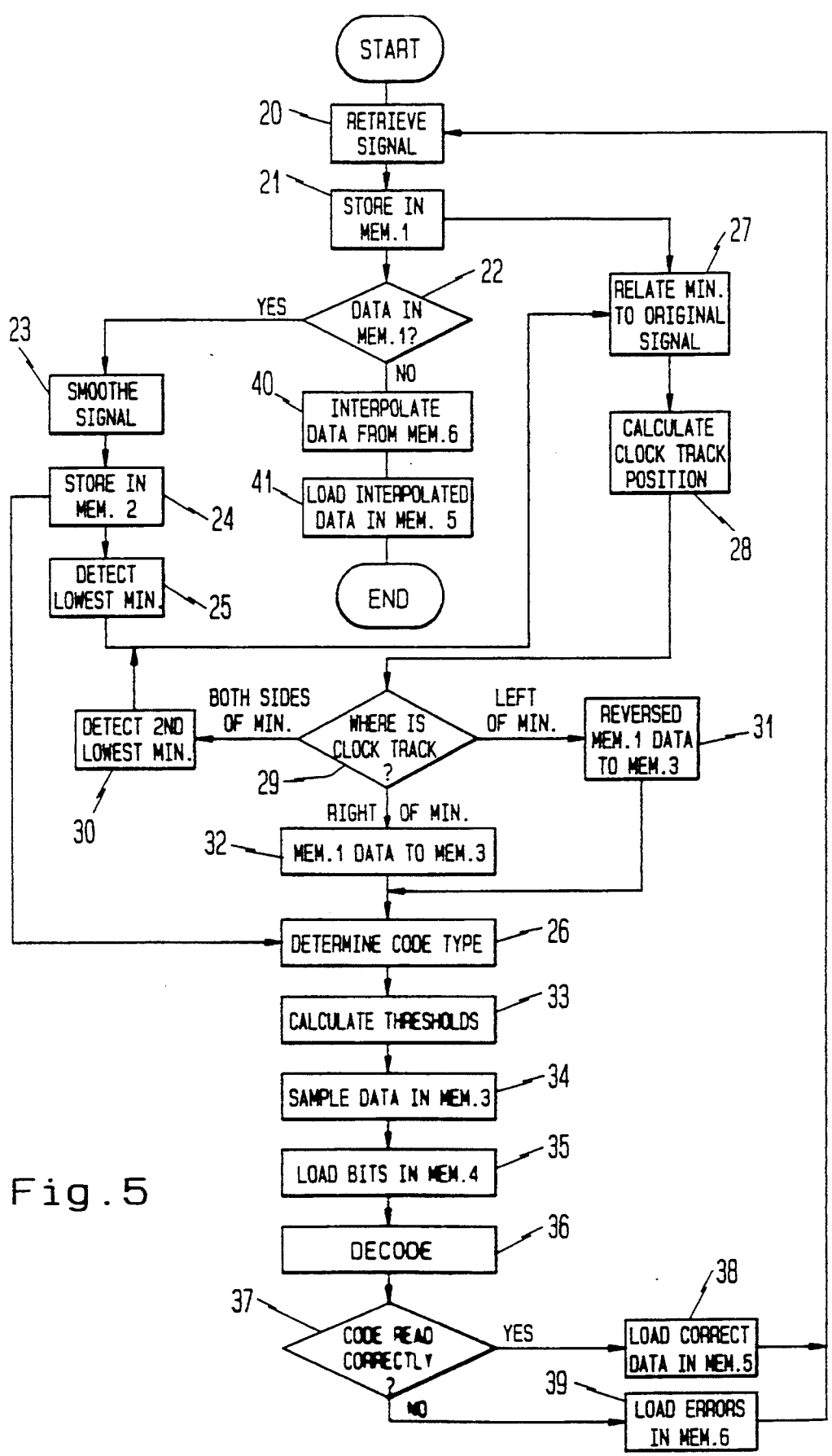
FIG. 5 is a flow chart for a reading method according to the invention.

Referring to the flow chart of FIG. 5, the data signal is analyzed as follows:

A part of the overall signal is read or retrieved (Step 20). This part of the overall signal corresponds to a 31.5 mm length of the filmstrip 1 and contains the data signal which is entered in a first memory (Step 21). Selection of a part of the overall signal which corresponds to a 31.5 mm length of the filmstrip 1 assures that the first memory contains data for at least one complete DX code. By means of the stepping motor 41, the data signal can be related to the corresponding location of the filmstrip 1. This is achieved by counting the number of steps taken by the filmstrip 1 to reach the location from which the data signal was derived. The number is stored in the first memory together with the data signal. If each step performed by the stepping motor 41 causes the filmstrip 1 to be transported through a distance of approximately 0.135 mm, about 233 steps are required to reach the location of the filmstrip 1 from which the data signal in the first memory was derived.

Figure 3C:
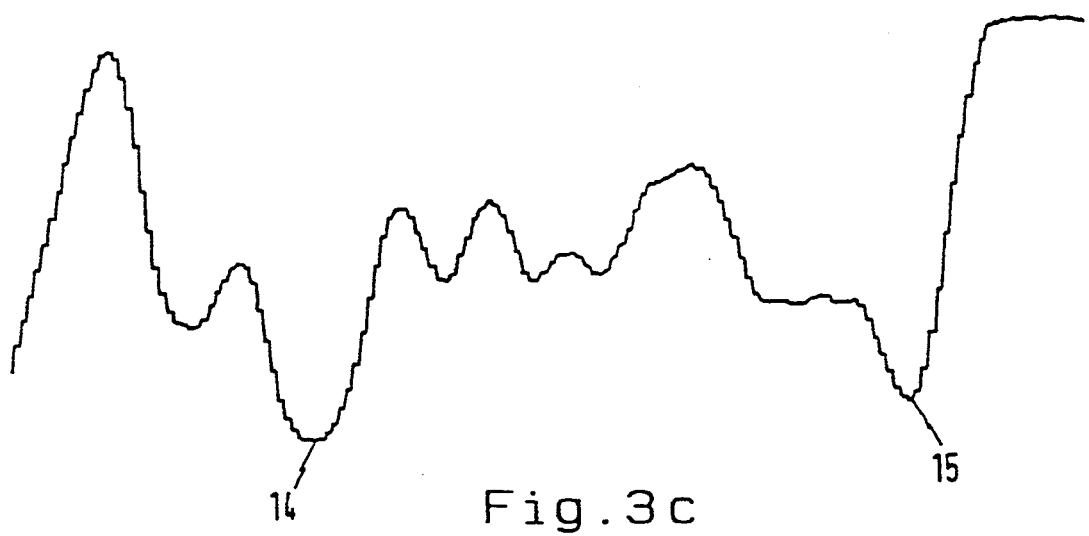
FIG. 3c illustrates the data signal of FIG. 3b after smoothing by means of low-pass filtering.

A determination is now made as to whether data are present in the first memory (Step 22). If yes, the program goes forward to Step 23 where the data signal from the first memory is smoothed by low-pass filtering. The smoothed or filtered signal obtained in this manner is entered in a second memory (Step 24). A filtered signal derived from the data signal of FIG. 3b is shown in FIG. 3c. The filtered signal again has several maxima as well as several minima.

The filtered signal is sampled (Step 25) to detect the lowest minimum 14. This lowest minimum 14 is assumed to correspond to the middle of the leading end portion of the bar code 5. The location of the data signal corresponding to the lowest minimum 14 is established (Step 27) and such location is identified by 14' in FIG. 3b. The location 14' is thus also assumed to correspond to the middle of the leading end portion of the bar code 5.

To reliably determine whether the segment of the bar code 5 containing the encoded information lies to the left or the right of the leading end portion, a Fourier transformation is performed on the left side as well as the right side of the location 14' corresponding to the middle of the leading end portion (Step 28). Since this makes it possible to calculate the number of times a particular frequency occurs in the data signal, the clocking track 9 with its uniform frequency can be readily recognized.

The relative position of the clocking track 9 and the location 14' is now determined (Step 29). If it is found that the clocking track 9 extends to both sides of the location 14' which was assumed to correspond to the leading end portion of the bar code 5, an error exists. This error is corrected by assuming that the second lowest minimum of the filtered signal of FIG. 3c corresponds to the leading end portion (Step 30). The program then returns to Step 27.

If it is found in Step 29 that the clocking track 9 lies to the left of the location 14' associated with the leading end portion of the bar code 5, this means that the bar code 5 was scanned backwards, that is, in a direction from the trailing end towards the leading end. In order to permit proper decoding of the data signal, the values obtained upon scanning the bar code 5 are stored in a third memory in reverse (Step 31). Thus, the data in the first memory are reversed and stored in the third memory.

Finally, if it is found in Step 29 that the clocking track 9 lies to the right of the location 14' corresponding to the leading end portion of the bar code 5, the data in the first memory are transferred to the third memory in the order in which they are stored in the first memory (Step 32).

The type of the bar code 5 is now determined by means of its length (Step 26). To this end, a second minimum 15 of the filtered signal of FIG. 3c is detected. The minimum 15, which is assumed to correspond to the middle of the trailing end portion of the bar code 5, is the minimum whose value is closest to but greater than that of the minimum 14 corresponding to the leading end portion of the bar code 5. The location of the data signal which corresponds to the minimum 15 is established and such location is denoted by 15' in FIG. 3b. The distance between the two locations 14',15' is then calculated. If the distance between the locations 14',15' is about 80 steps, the bar code 5, as illustrated in FIG. 3a, is an extended DX code containing a frame number. On the other hand, if the distance between the locations 14',15' is approximately 64 steps, the bar code 5 is a short DX code which contains information only on the type of film and the manufacturer.

Next, an upper threshold value Sh and a lower threshold value Sd for use during a subsequent sampling of the data signal are calculated (Step 33). With reference to FIG. 4, the upper threshold value Sh is calculated by means of the following equation:

$$Sh = 2A(tc) + A(tb) - A(ta)/2 \qquad (1)$$

where

A(ta) is the amplitude of the first maximum, ta, following the location 14' of the data signal, A(tb) is the amplitude of the minimum, tb, immediately following the first maximum ta, and A(tc) is the amplitude of the next maximum tc.

The lower threshold value Sd is calculated by means of the following equation:

$$Sd = A(ta) + A(tb)/2 \qquad (2)$$

The segment or part 18 of the data signal corresponding to the segment of the bar code 5 containing the encoded information is now sampled in steps to detect the maxima and minima (Step 34). The length of each step equals the distance through which the filmstrip 1 advances during a step of the stepping motor 41. If the bar code 5 was found to be an extended DX code, then 69 steps are required to sample the data segment 18 of the data signal.

The first three sampling steps 16 are carried out at the second maximum, tc, following the location 14' which corresponds to the middle of the leading end portion of the bar code 5. The measured values are compared with the upper threshold value Sh. If the largest of the three measured values lies above the upper threshold value Sh, a "0" is placed in the first storage space of a fourth memory (Step 35). In the event that none of the three measured values exceeds the upper threshold value Sh, a "1" is inserted in the first storage space of the fourth memory.

The next three sampling steps 17 are carried out at the data signal minimum immediately following the maximum tc. The three measured values are here compared with the lower threshold value Sd. If one of the measured values lies below the lower threshold value Sd, a "1" is placed in the second storage space of the fourth memory. Conversely, if all of the measured values obtained during the sampling steps 17 lie above the lower threshold value Sd, a "0" is inserted in the second storage space of the fourth memory.

The entire data segment 18 of the data signal is sampled in this manner and a set of three measured values is alternately compared with the upper threshold value Sh and the lower threshold value Sd. The bits stored in the fourth memory by virtue of the comparisons are shown in FIG. 4 below the corresponding maxima and minima.

The sampling procedure produces a decipherable array of bits 19 in the fourth memory. Upon completion of the array 19, the latter is decoded (Step 36).

Error detection routines are now employed to determine whether the bar code 5 can be read correctly. If yes, the content and position of the bar code 5 are entered in a fifth memory (Step 38). On the other hand, if a reading error is detected, this is retained in a separate error memory (Step 39). The program then returns to Step 20 and retrieves the next part of the signal obtained during scanning of the filmstrip 1.

Once the last part of the signal for the filmstrip 1 has been processed in the manner described above, the first memory no longer contains data. This is established during Step 22 and the program next proceeds to Step 40. The data in the error memory are now analyzed and the erroneous bar codes and positions are interpolated using the data in the fifth memory. The results of the analysis and interpolation are then entered in the fifth memory. This memory now contains the decoded information, as well as the positions, of all of the bar codes on the filmstrip 1.

Without further analysis, the foregoing will so fully reveal the gist of the present invention that others can, by applying current knowledge, readily adapt it for various applications without omitting features that, from the standpoint of prior art fairly constitute essential characteristics of the generic and specific aspects of my contribution to the art and, therefore, such adaptations should and are intended to be comprehended within the meaning and range of equivalence of the appended claims.

I claim:

1. A method of reading a code, particularly in a photographic printer, comprising the steps of scanning said code; generating a data signal representative of said code based on the scanning step, said data signal having maxima and minima; establishing the type of said code using said data signal; sampling a selected part of said data signal to detect selected maxima and selected minima; comparing each of said selected maxima with a first value and each of said selected minima with a second value; and deriving a decipherable set of data bits using the results of the comparing step.

2. The method of claim 1, wherein the establishing step comprises determining the length of said code.

3. The method of claim 2, wherein the scanning step is performed by moving said code and a sensor for the same relative to one another, said code having a pair of end portions, and said determining including detecting said end portions, and measuring the relative speed of said sensor and said code.

4. The method of claim 3, wherein said moving comprises advancing said code stepwise and said measuring comprises counting the steps taken by said code.

5. The method of claim 4, further comprising the step of issuing a pulse in response to each step taken by said code, said counting comprising recording said pulses.

6. The method of claim 1, wherein said code comprises a bar code having bars and gaps between neighboring bars, the establishing step including determining the number of bars and gaps.

7. The method of claim 6, wherein said bar code includes a segment which contains encoded information and said selected part corresponds to said segment, the sampling step being performed in steps, and the number of said steps being related to the number of bars and gaps in said segment.

8. The method of claim 1, wherein said code has two end portions and a segment between said end portions containing encoded information, said selected part corresponding to said segment.

9. The method of claim 1, wherein said code is provided on a marginal portion of a photographic material.

10. The method of claim 1, wherein said code includes a clocking section, and another section laterally adjacent said clocking section and containing encoded information, the scanning step including scanning said sections simultaneously.

11. The method of claim 1, further comprising the step of calculating said values using said data signal.

12. The method of claim 1, wherein the scanning step produces a raw signal and the generating step comprises processing said raw signal to obtain said data signal, said processing including amplification, conversion to logarithmic form and digitization.

13. The method of claim 12, further comprising the step of storing said data signal.

14. The method of claim 12, further comprising the step of subjecting said data signal to low-pass filtering to obtain a filtered signal.

15. The method of claim 14, further comprising the step of storing said filtered signal.

16. The method of claim 1, wherein said code has a first end portion which corresponds to a first part of said data signal and a second end portion which corresponds to a second part of said data signal; and further comprising the steps of subjecting said data signal to low-pass filtering to obtain a filtered signal having a first minimum corresponding to said first end portion and a second minimum corresponding to said second end portion, and identifying said first and second parts by detecting said first and second minima.

17. The method of claim 16, wherein said first minimum is the lowest minimum of said filtered signal and said second minimum is the second lowest minimum of said filtered signal.

18. The method of claim 1, wherein said code has an end portion and said data signal has a part which corresponds to said end portion; and further comprising the step of determining the orientation of said code by performing analyses on opposite sides of said part.

19. The method of claim 18, wherein the determining step comprises carrying out a Fourier transformation on each of said sides.

20. An arrangement for reading a code, particularly for use in a photographic printer, comprising means for scanning the code and generating a data signal which contains maxima and minima and is representative of the code; and means for establishing the type of the code using the data signal, sampling a selected part of the data signal to detect selected maxima and selected minima, comparing each of the selected maxima with a first value and each of the selected minima with a second value, and deriving a decipherable set of data bits using the results of the comparisons.

21. An arrangement for reading a code, particularly a code on a margin of a photographic material, the code having a clocking section containing alternating light and dark segments, and another section laterally adjacent the clocking section and containing encoded information, said arrangement comprising means for positioning the code means for detecting the code and for generating a data signal which is representative the code and includes a first part corresponding to a light segment, and a second part corresponding to a dark segment, of the clocking section, said detecting and generating means including a sensor for scanning both sections of the code simultaneously; and means for comparing the first part of the data signal with a first value and the second part of the data signal with a second value different from the first value.

22. The arrangement of claim 21, wherein the code has a predetermined width and said sensor has a width at least equal to the predetermined width.

23. The arrangement of claim 21, wherein said sensor is a photosensor.

24. The arrangement of claim 21, wherein said positioning means comprises means for directing the code along a marginal portion of a predetermined path having a pair of opposed marginal portions, said sensor being disposed in the region of one of said marginal portions.

25. The arrangement of claim 24, wherein said detecting means comprises an additional sensor in the region of the other of said marginal portions, said sensors being substantially identical.

26. The arrangement of claim 21, further comprising a carriage, said sensor being mounted on said carriage.

* * * * *